(12) United States Patent
Malagrino, Jr. et al.

(10) Patent No.: US 7,178,996 B2
(45) Date of Patent: Feb. 20, 2007

(54) HIGH DENSITY OPTICAL TRANSCEIVER

(75) Inventors: Gerald Daniel Malagrino, Jr., Rochester, MN (US); Michael L. Zumbrunnen, Rochester, MN (US)

(73) Assignee: JDS Uniphase Corporation, Milpitas, CA (US)

( * ) Notice: Subject to any disclaimer, the term of this patent is extended or adjusted under 35 U.S.C. 154(b) by 79 days.

(21) Appl. No.: 11/081,442

(22) Filed: Mar. 16, 2005

(65) Prior Publication Data

US 2005/0226571 A1 Oct. 13, 2005

Related U.S. Application Data

(60) Provisional application No. 60/561,093, filed on Apr. 9, 2004.

(51) Int. Cl.
*G02B 6/36* (2006.01)
*G02B 6/43* (2006.01)
*H05K 5/00* (2006.01)

(52) U.S. Cl. .................. 385/92; 385/89; 361/730; 361/752

(58) Field of Classification Search .............. None
See application file for complete search history.

(56) References Cited

U.S. PATENT DOCUMENTS

| 6,259,856 | B1 * | 7/2001 | Shahid ................ 385/147 |
| 6,267,606 | B1 * | 7/2001 | Poplawski et al. ......... 439/92 |
| 6,530,699 | B1 * | 3/2003 | Gilliland et al. .......... 385/88 |
| 6,612,868 | B2 * | 9/2003 | Hwang .............. 439/607 |
| 6,778,399 | B2 * | 8/2004 | Medina et al. .......... 361/729 |
| 2003/0076658 | A1 * | 4/2003 | Aronson et al. ........ 361/741 |
| 2005/0226626 | A1 * | 10/2005 | Zhang et al. ........... 398/135 |

* cited by examiner

*Primary Examiner*—Sung Pak
*Assistant Examiner*—Omar Rojas
(74) *Attorney, Agent, or Firm*—Allen, Dyer, Doppelt, Milbrath & Gilchrist, P.A.

(57) ABSTRACT

The invention relates to a high density small form factor opto-electronic transceiver system in which the module housing and guide rail from a large form factor transceiver system, e.g. an $X_2$ transceiver, are used to house a plurality of small form factor transceivers. Ideally up to four independently functioning pluggable small form factor transceivers are plugged into the module housing of the larger form factor transceiver, which has been modified to form a shell. The shell houses a printed circuit board, which has a plurality of electrical connectors on one end for receiving the transceivers, and a single electrical connector on the other end for plugging into a host system.

20 Claims, 5 Drawing Sheets though obviously due to cross-talk considerations, a 1×4 or a 4×1 array are also possible with the aforementioned guide rails being repositioned to the top of the base 42.

HIGH DENSITY OPTICAL TRANSCEIVER

CROSS-REFERENCE TO RELATED APPLICATIONS

The present invention claims priority from U.S. patent application Ser. No. 60/561,093 filed Apr. 9, 2004, which is incorporated herein by reference.

TECHNICAL FIELD

The present invention relates to a high density optical transceiver, and in particular to a high density small form factor transceiver in which four small form factor transceivers are mounted in a single larger form factor housing for plugging into a host system.

BACKGROUND OF THE INVENTION

A large form factor optical transceiver, e.g. an $X_2$ optical transceiver generally indicated at 1 in FIGS. 1a and 1b, includes an optical coupler 2 at a front end thereof, with optical bores 3 and 4 for receiving a conventional SC optical duplex connector (not shown), which has a distance between the center lines of the active optical bores of approximately 12.7 mm. A transmitter optical sub-assembly (TOSA) and a receiver optical sub-assembly (ROSA) are mounted within a housing 6, which includes a base 7 and a cover 8. The housing 6 is approximately 36 mm wide, 23 mm high and 91 mm long, with heat sink fins 9 extending upwardly from the cover 8 for dissipated heat generated therein. A module printed circuit board (PCB) including control and monitoring circuitry for the ROSA and TOSA has a seventy-pin electrical connector 11 extending therefrom and from a rear end of the housing 6 for interconnection with a mating host electrical connector 12 mounted on a printed circuit board (PCB) 13 of a host device 14. The host device 14 includes a bezel with openings therein, which are sized to receive the housing 6 and abut an abutting flange 17 extending from around the optical connector 2. A guide rail 18 is mounted on the host PCB 13 for guiding the housing 6 until the electrical connector 11 engages the host electrical connector 12, the abutting flange 17 abuts the bezel, and a resilient latching element 19 extends into a corresponding latching recess in the guide rail 18. The $X_2$ multi-source agreement (MSA) as found at X2MSA.org is incorporated herein by reference. Other large form factor transceivers include the XPAK transceiver and the XENPACK transceiver, the MSA's of which, found at xpak.org and xenpack.org, respectively, are incorporated herein by reference.

Conventional small form factor (SFF) transceivers, generally indicated at 20 in FIG. 2, include a ROSA 21 mounted in a housing 22 along side a TOSA 23. A PCB 24 includes TOSA and ROSA control and monitoring circuitry, e.g. chip 25. The housing 22 is approximately 8.6 mm high, 13.7 mm wide and 49 mm long. An electrical connector 27 extends from a rear end of the housing 22 for mating with a host mounted electrical connector (not shown). For a board mounted SFF transceiver the electrical connector includes pins extending from the PCB 24; however, for a pluggable SFF transceiver (SFP) the electrical connector 27 includes a card edge connector formed in the end of the PCB 24. Bores 33 and 34 form an optical connector on a front end of the housing 22 for receiving an LC duplex optical connector 35 with a distance between optical bore centerlines of 6.35 mm or half that of an SC duplex optical connector. Typically an SFP transceiver is mounted in a small metal cage fixed to the host circuit board, with an electrical connector at one end thereof for receiving the electrical connector 27.

With the popularity of the original large form factor transceivers, the supply chain for transceivers is heavily populated with housings, heat sinks, electrical connectors and guide rails useful only for large form factor devices. With the latest trend towards increasing transceiver density, small form factor devices have become more popular, while the large form factor devices and all the components therefor have become obsolete.

An object of the present invention is to overcome the shortcomings of the prior art by providing a large form factor transceiver housing suitable for receiving a plurality of small form factor transceivers enabling large form factor components to be used with small form factor transceivers.

SUMMARY OF THE INVENTION

Accordingly, the present invention relates to a module for receiving a plurality of small form factor transceivers comprising:
a module housing for mounting in the host system, the module housing including a plurality of ports for receiving the plurality of transceivers;
a module printed circuit board mounted in the module housing;
a module electrical connector extending from the module housing for electrically connecting the module printed circuit board to a printed circuit board of the host system; and
wherein the module printed circuit board is for transmitting signals between the plurality of transceivers and the module electrical connector.

BRIEF DESCRIPTION OF THE DRAWINGS

The invention will be described in greater detail with reference to the accompanying drawings which represent preferred embodiments thereof, wherein.

DETAILED DESCRIPTION

Figure 1A:
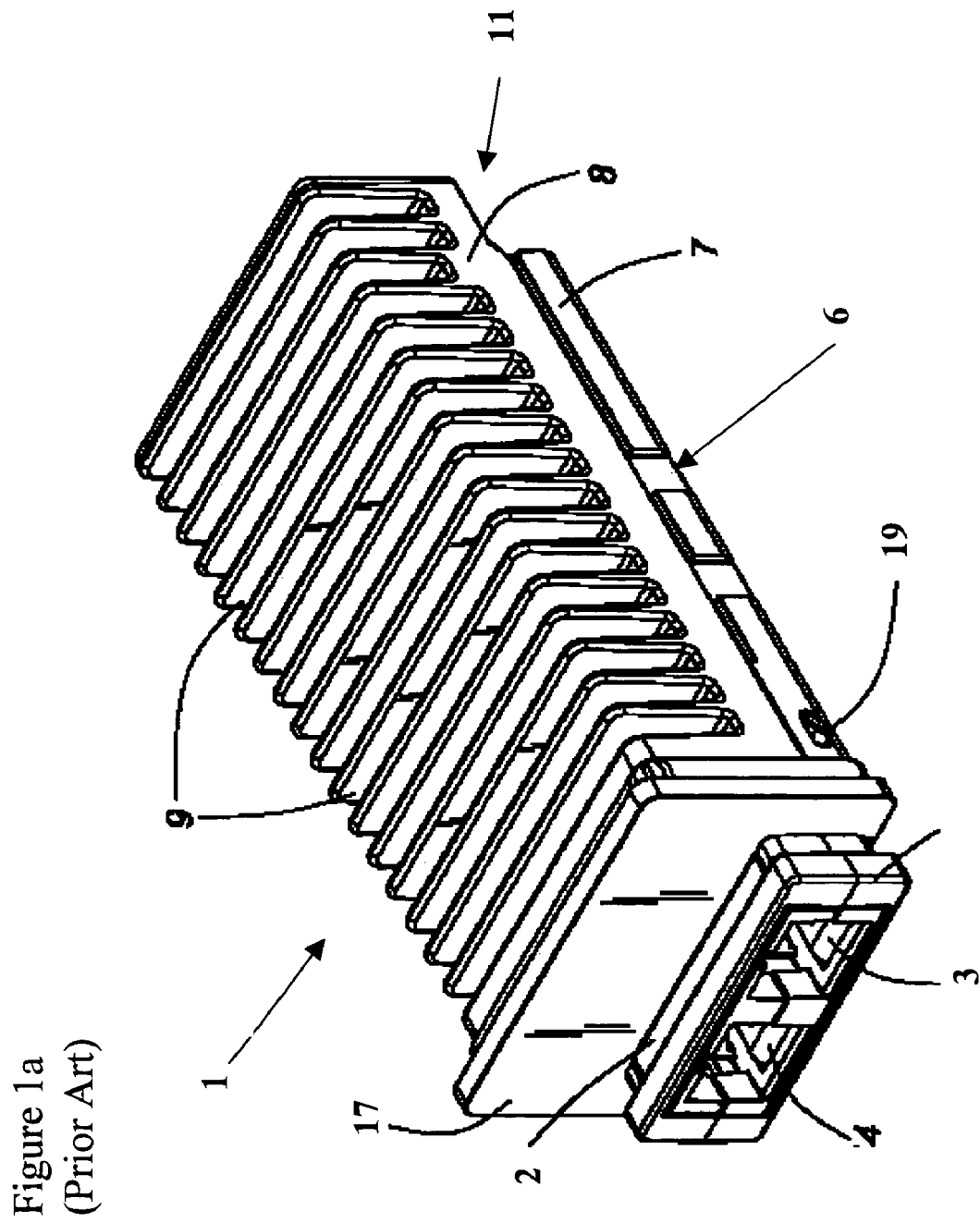
FIG. 1a is an isometric view of a conventional large form factor $X_2$ transceiver.
Figure 1B:
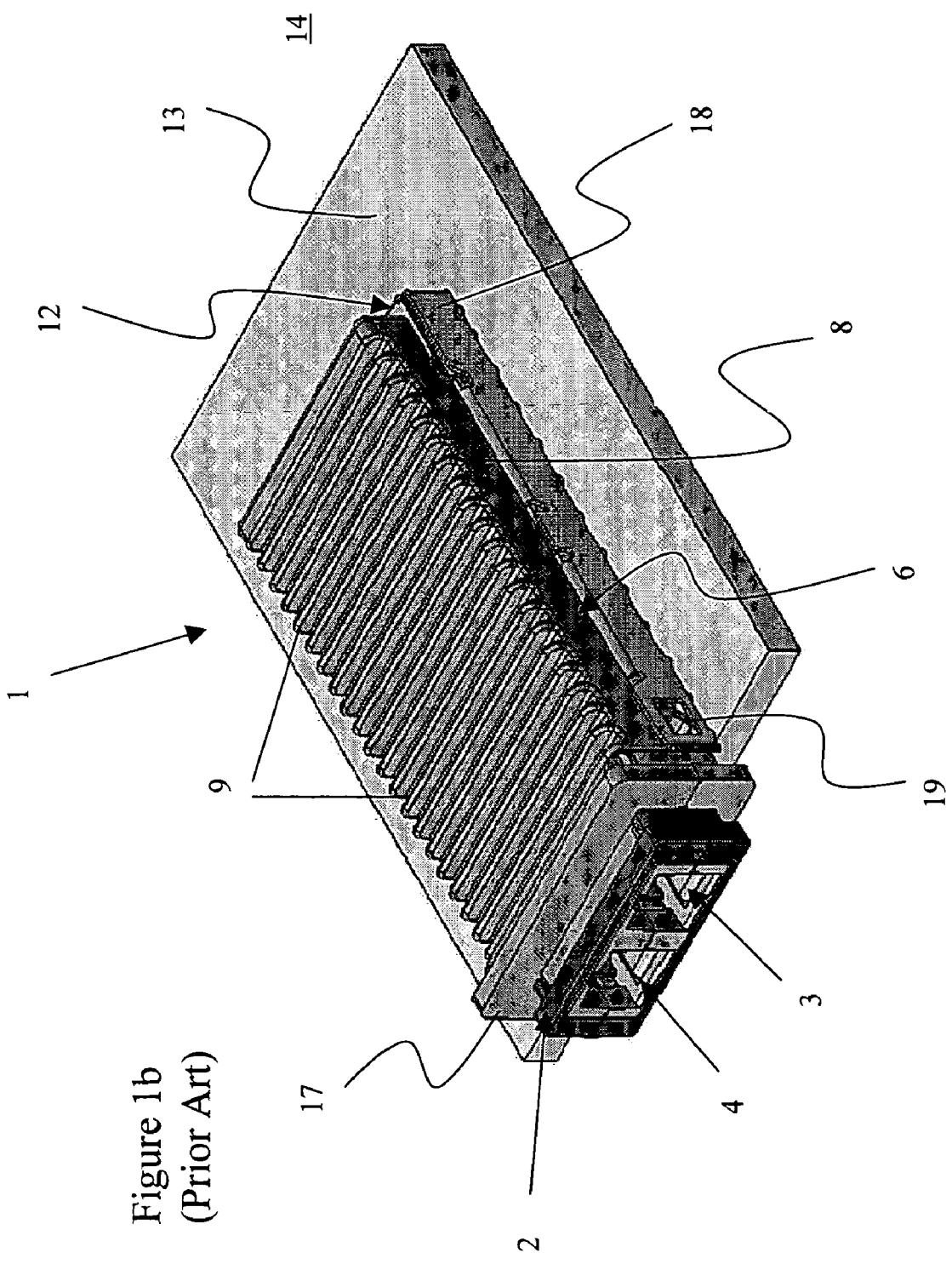
FIG. 1b is a view of the $X_2$ transceiver of FIG. 1 mounted in a guide rail.
Figure 2:
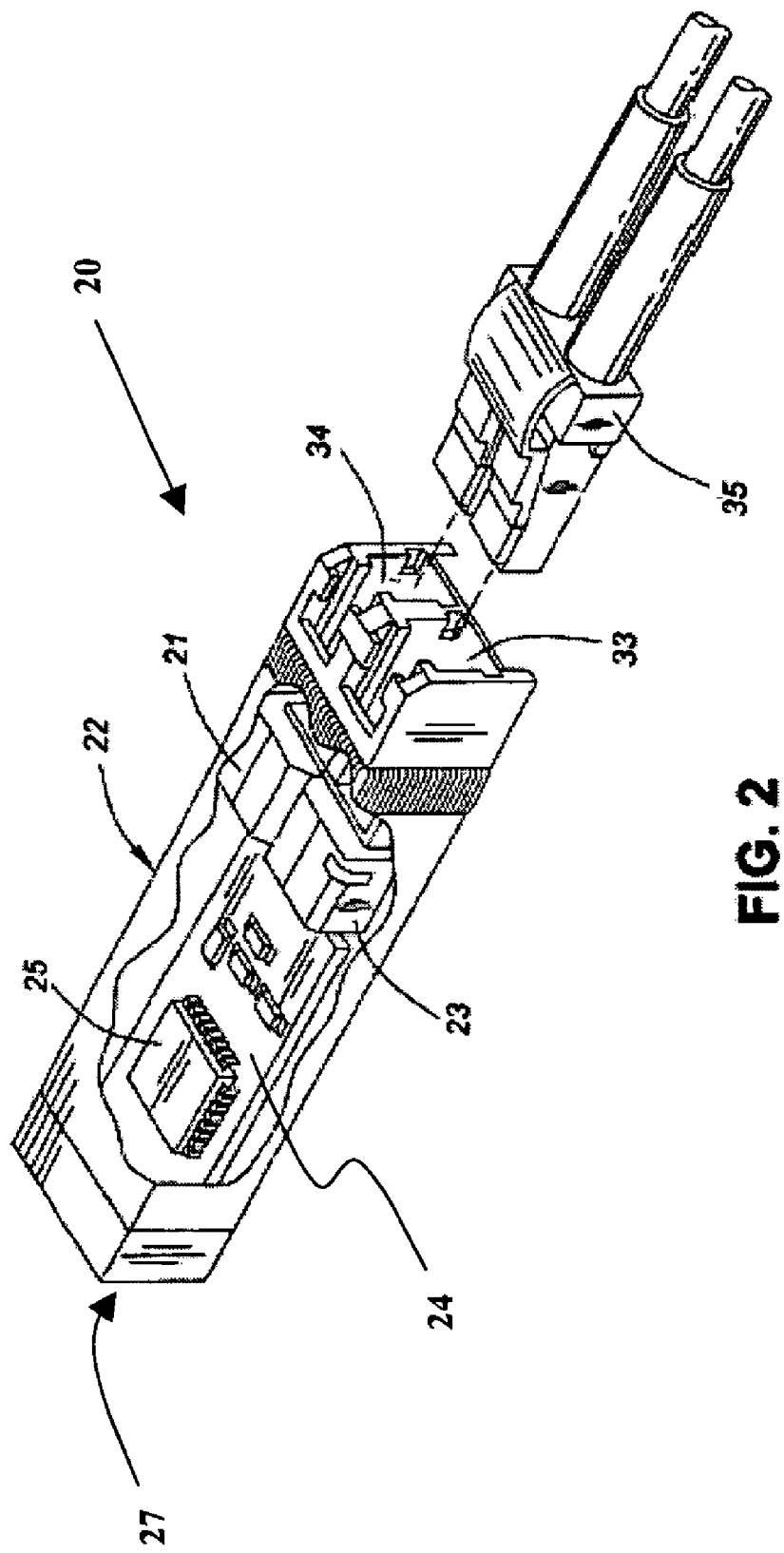
FIG. 2 is an isometric view of a conventional small form factor (SFF) transceiver.
Figure 3:
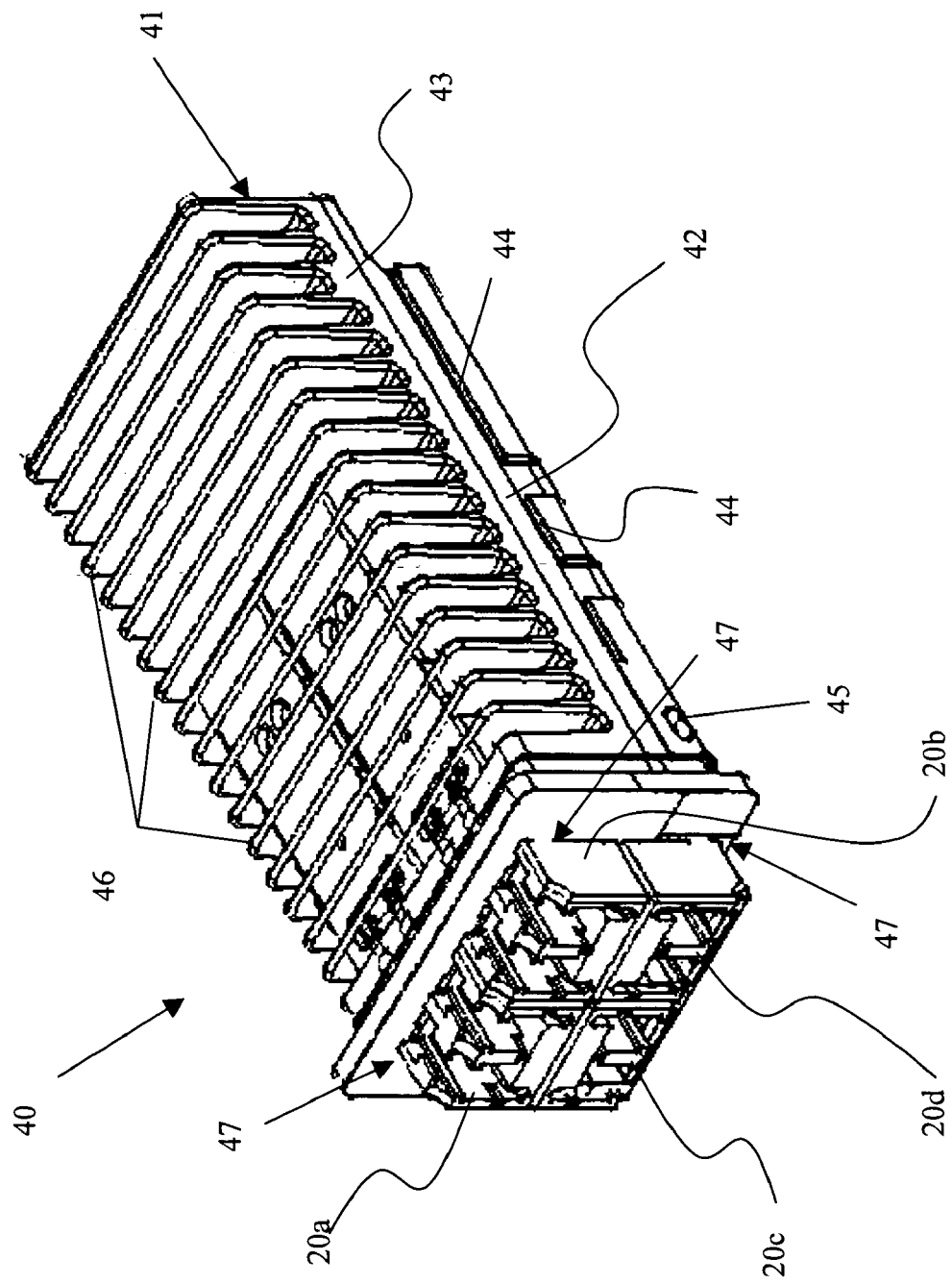
FIG. 3 is an isometric view of a high density SFF transceiver according to the present invention.
Figure 4:
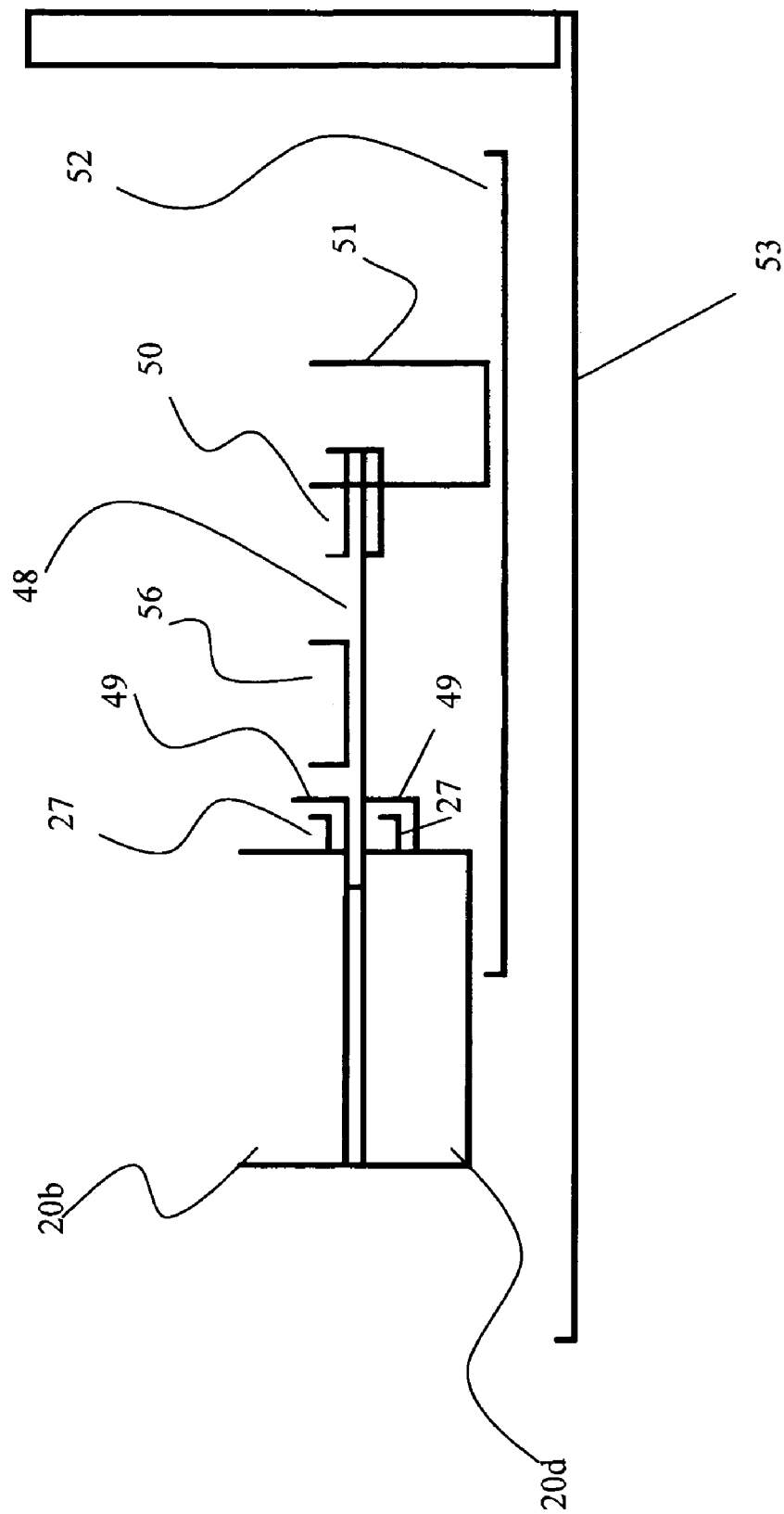
FIG. 4 is a side view of the high density SFF transceiver of FIG. 3 with the housing removed.

With reference to FIGS. 3 and 4, a high density SFF transceiver, generally indicated at 40, includes a housing shell 41 made up of a base 42 and a heat sink cover 43 dimensioned the same as a large form factor transceiver, e.g. the $X_2$ transceiver 1. Mounting surfaces 44 extend from the side of the base 42 for mounting in a conventional large form factor guide rail, e.g. guide rail 11. Resilient latching elements 45 extend through the side of the base 42 for engaging a corresponding recess in the guide rail 11 for locking the transceiver 40 therein. Heat sink fins 46 extend from the cover 43 for dissipating heat generated within the housing 41. A front end of the housing shell 41 includes a plurality of insertion ports 47 for receiving a plurality of SFF transceivers, e.g. four transceivers 20a to 20d. In accordance with the dimension of the $X_2$ transceiver, a 2×2 array of SFF transceivers can be mounted within the housing shell 41.

The SFF transceivers can be any combination of SFF (board mounted) or SFP transceivers of 1 Gb/s, 2 Gb/s, 2.5 Gb/s, 3.125 Gb/s, 4 Gb/s, 10 Gb/s or CWDM. Furthermore, multiple families of transceivers can be used which are compatible with Gigabit Ethernet (GbE), Fiber Channel (FC), Ten Gigabit Attachment User Interface (XAUI), Sonet, etc.

With reference to FIG. 4, a printed circuit board (PCB) 48, mounted in the housing 41, includes a plurality of electrical connectors 49 on one end thereof for electrically connecting the electrical connectors 27 from the plurality of transceivers 20a to 20d thereto. For standard board mounted transceivers, the pins from the electrical connector 27 are soldered to the PCB 48; however, for SFP transceivers card edge connectors 27 are pluggable into the electrical connectors 49. A single electrical connector, e.g. a seventy pin card edge connector 50, extends from the opposite end of the PCB 48 for electrically connecting the transceiver 40 to a host electrical connector 51 mounted on a host PCB 52 within a host device 53. In a first embodiment, the PCB 48 simply transmits every signal directly between the electrical connectors on the transceivers 20a to 20d to the electrical connector 50 providing independent communication between the transceivers 20a to 20d and the host device 53. In this case, a plurality of transceivers are packed in a small space with a single heat sink cover 43, maximizing both density and heat dissipation.

In an alternative embodiment, the PCB 48 includes circuitry for combining a plurality of the received electrical signals into a single higher data rate signal, and for separating a high data rate signal into a plurality of lower rate signals for transmission, e.g. a ten Gigabit Attachment User Interface (XAUI). For example, four 2.5 Gb incoming signals can be combined into a single 10 Gb signal (or a single 10 Gb signal is separated into four 2.5 Gb signal). This configuration will enable higher data rates to be achieved with lower technology, e.g. four 4 Gb incoming signals combined into a single 16 Gb signal, and vice versa.

When the SFF transceivers 20a to 20d are provided with fault and digital diagnostic monitoring (DDM) features, each transceiver 20a to 20d can be treated individually, i.e. each transceiver 20a to 20d has one or more addresses on a serial bus 56 found on the PCB 47, whereby the electrical connector 49 has at least one pin designated for each transceiver 20a to 20d for transmitting fault and/or DDM signals. Alternatively, all four transceivers 20a to 20d can be treated as a single device, whereby a fault in any one device is acknowledged by a single fault signal.

Specific ports, i.e. specific electrical connectors 49, can be designed to automatically switch over to another port in the event of a failure, independent of the host's blade hardware and firmware. In particular, if the signals are being combined, one of the ports 47 can be a redundant port, which is not normally used, whereby if one of the active transceivers stop working, the signal portion can be transmitted via the redundant transceiver.

One or more of the transceivers 20a to 20d can be a "copper transceiver", which are used as short distance "Patch Cables" in a Datacom equipment room setting. A copper transceiver assembly includes a multi-conductor cable that is soldered at one end to the PCB within the transceiver and at the other end to a PCB within a remote copper transceiver.

Ideally, the SFF transceivers 20a and 20b on the top row are mounted "belly to belly" (as in FIGS. 3 & 4) with the SFF transceivers 20c and 20d, respectively, on the bottom row to facilitate mounting on the PCB 47, and to facilitate access to any latching device, e.g. a bail latch, as is well know in the industry. The term "belly to belly" infers that the bottom of the transceivers 20a and 20b are adjacent to the bottoms of the transceivers 20c and 20d, respectively. However, other configurations are possible, such as "side to side", in which the sides of transceiver 20a is adjacent the side of transceiver 20c, i.e. the bottom of the transceiver 20a is adjacent the bottom of transceiver 20b. Alternatively, all the transceivers 20a to 20d could have the same orientation, i.e. unidirectional.

We claim:

1. An optical transceiver device for mounting in a host system, which includes a host printed circuit board, comprising:
   a module housing with dimensions the same as an optical transceiver of a first form factor for mounting in a guide rail or cage in the host system;
   a module printed circuit board mounted in the module housing;
   a module electrical connector extending from the module housing for electrically connecting the module printed circuit board to the host printed circuit board; and
   a plurality of transceivers with dimensions of an optical transceiver of a second form factor, smaller than the first form factor, mounted in the module housing electrically connected to the module printed circuit board, each transceiver including an optical connector for receiving optical fibers, a receiver optical sub-assembly for converting received optical signals into electrical signals, a transmitter optical subassembly for converting electrical signals into optical signals, and a transceiver electrical connector;
   wherein the module printed circuit board transmits signals between the plurality of transceivers and the module electrical connector.

2. The device according to claim 1, wherein each transceiver electrical connector comprises a pluggable transceiver electrical connector; and wherein a plurality of board electrical connectors extend from the module printed circuit board for receiving the pluggable transceiver electrical connectors.

3. The device according to claim 2, wherein the module electrical connector is pluggable into a mating host electrical connector on the host printed circuit board.

4. The device according to claim 3, wherein the module housing includes mounting surfaces for engaging a guide rail or cage mounted on the host printed circuit board, which guides the module electrical connector into contact with the host electrical connector.

5. The device according to claim 4, wherein the module housing has the dimensions of a large form factor transceiver selected from the group consisting of an $X_2$ transceiver, and XPAK transceiver, and a XENPAK transceiver.

6. The device according to claim 1, wherein the module housing includes a heat sink extending therefrom for dissipating the heat generated from the plurality of transceivers.

7. The device according to claim 1, wherein the plurality of transceivers are aligned in first and second rows with a bottom of each transceiver in the first row adjacent to a bottom of one of the transceivers in the second row.

8. The device according to claim 1, wherein each transceiver electrical connector includes a pin for transmitting fault detection signals; and wherein the module electrical connector includes a plurality of pins for transmitting the fault detection signals from each transceiver.

9. The device according to claim 1, wherein the module printed circuit board includes control circuitry for combining electrical signals from the plurality of transceivers into a single higher data rate electrical signal.

10. The device according to claim 9, wherein one of the board electrical connectors will switch to another board electrical connector when a failure is detected in one of the transceivers.

11. A module for receiving a plurality of first form factor transceivers comprising:
   a module housing with dimensions the same as an optical transceiver of a second form factor, larger than the first form factor for mounting in a guide rail or cage on a host printed circuit board in a host system, the module housing including a plurality of ports for receiving the plurality of transceivers;
   a module printed circuit board mounted in the module housing;
   a module electrical connector extending from the module housing for electrically connecting the module printed circuit board to the host printed circuit board; and
   wherein the module printed circuit board is for transmitting signals between the plurality of first form factor transceivers and the module electrical connector.

12. The device according to claim 11, wherein each transceiver comprises a pluggable transceiver electrical connector; and wherein a plurality of board electrical connectors extend from the module printed circuit board for receiving the pluggable transceiver electrical connectors.

13. The device according to claim 12, wherein the module electrical connector is pluggable into a mating host electrical connector on the host printed circuit board.

14. The device according to claim 13, wherein the module housing includes mounting surfaces for engaging a guide rail or cage mounted on the host printed circuit board, which guides the module electrical connector into contact with the host electrical connector.

15. The device according to claim 14, wherein the module housing has the dimensions of a large form factor transceiver selected from the group consisting of an $X_2$ transceiver, and XPAK transceiver, and a XENPAK transceiver.

16. The device according to claim 11, wherein the module housing includes a heat sink extending therefrom for dissipating the heat generated from the plurality of transceivers.

17. The device according to claim 11, wherein the plurality of transceivers are alignable in first and second rows with a bottom of each transceiver in the first row adjacent to a bottom of one of the transceivers in the second row.

18. The device according to claim 11, wherein each transceiver electrical connector includes a pin for transmitting fault detection signals; and wherein the module electrical connector includes a plurality of pins for transmitting the fault detection signals from each transceiver.

19. The device according to claim 11 wherein the module printed circuit board includes control circuitry for combining electrical signals from the plurality of transceivers into a single higher data rate electrical signal.

20. The device according to claim 19, wherein one of the board electrical connectors will switch to another board electrical connector when a failure is detected in one of the transceivers.

* * * * *